US009571599B2

(12) United States Patent
Giebler

(10) Patent No.: US 9,571,599 B2
(45) Date of Patent: *Feb. 14, 2017

(54) MULTIMEDIA REDIRECTION IN A VIRTUALIZED ENVIRONMENT USING A PROXY SERVER

(71) Applicant: Citrix Systems, Inc., Fort Lauderdale, FL (US)

(72) Inventor: Todd Giebler, Ft. Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/840,967

(22) Filed: Aug. 31, 2015

(65) Prior Publication Data
US 2015/0373136 A1 Dec. 24, 2015

Related U.S. Application Data

(63) Continuation of application No. 14/152,114, filed on Jan. 10, 2014, now Pat. No. 9,124,668.

(60) Provisional application No. 61/825,506, filed on May 20, 2013.

(51) Int. Cl.
*H04L 29/06* (2006.01)
*H04L 29/08* (2006.01)
*G06F 9/455* (2006.01)
*G06F 21/53* (2013.01)

(52) U.S. Cl.
CPC ........... *H04L 67/2823* (2013.01); *H04L 65/60* (2013.01); *H04L 67/02* (2013.01); *H04L 67/42* (2013.01); *G06F 9/455* (2013.01); *G06F 21/53* (2013.01)

(58) Field of Classification Search
CPC ............................ H04L 67/2823; H04L 67/42
USPC ........ 709/203, 204, 205, 206, 246; 715/733, 715/744
See application file for complete search history.

(56) References Cited

U.S. PATENT DOCUMENTS

| | | | |
|---|---|---|---|
| 8,887,152 B1* | 11/2014 | Chen | G06F 9/44568 717/174 |
| 9,037,643 B2* | 5/2015 | Kazerani | H04L 67/20 709/203 |
| 2002/0007393 A1 | 1/2002 | Hamel | |
| 2009/0144725 A1* | 6/2009 | Vrhel Jr. | G06F 8/60 717/174 |
| 2009/0158141 A1 | 6/2009 | Bauchot et al. | |
| 2009/0287772 A1 | 11/2009 | Stone et al. | |

(Continued)

OTHER PUBLICATIONS

"Deploying Virtual Machines as Sandboxes for the Grid"—Santhanam et al, University of Wisconsin Madison, Apr. 2011 https://research.cs.wisc.edu/htcondor/doc/SandboxingWorlds053.pdf.*

(Continued)

*Primary Examiner* — Randy Scott
(74) *Attorney, Agent, or Firm* — Banner & Witcoff, Ltd.

(57) ABSTRACT

Methods and systems for multimedia redirection in a virtualized environment using a proxy server are described herein. The proxy server may store scripting code that may be injected into web content retrieved from a content resource server. The injected scripting code may cause an instantiated application in the virtualized environment to intercept/override at least some method calls in the web content. The proxy server may send the redirected multimedia content and other information to a client agent application executing on a user's computing device for rendering.

20 Claims, 10 Drawing Sheets

(56) References Cited

U.S. PATENT DOCUMENTS

| | | |
|---|---|---|
| 2010/0332993 A1 | 12/2010 | Bousseton et al. |
| 2011/0145431 A1 | 6/2011 | Momchilov et al. |
| 2012/0089700 A1 | 4/2012 | Safruti et al. |
| 2013/0091543 A1 | 4/2013 | Wade et al. |
| 2013/0238746 A1 | 9/2013 | Parandehgheibi et al. |

OTHER PUBLICATIONS

Moshchuk, et al, "Flashproxy: Transparently Enabling Rich Web Content via Remote Execution," MobiSys '08, Jun. 17-20, 2008, Breckenridge, Co. © 2008, pp. 81-93,.

Sep. 11, 2014—(PCT) International Search Report—App.. PCT/US2014/038065.

Jan. 12, 2015—(US) Non-Final Office Action—U.S. Appl. No. 14/152,114.

Does Your Network Need a Proxy Server?, Gerry Blackwell, downloaded May 20, 2013, www.praticallynetworked.com/networking/does-your-network-need-a-proxy.htm © 2013 QuinStreet Inc., pp. 1-5.

HDX Technology, Best Practices and Recommendations for Citrix Receiver 3 and HDX Technology with XenDesktop, Citrix Consulting Solutions/White Paper © 2011 Citrix Systems, Inc., 34 pages.

How to Stream Videos With Web Proxy, Bill Richards, downloaded May 20, 2013, www.ehow.com/print/how_6152425_stream-videos-proxy, html, 1 page.

Wikipedia, HTML5 video,1 en.wikipedia.org/wiki/HTML5_video, downloaded Apr. 26, 2013, pp. 1-5.

Mastering Ajax, Part 2: Make asynchronous requests with JavaScript and Ajax, Brett McLaughlin, Jan. 17, 2006, downloaded May 15, 2013, www.bim.com/developerworks/web/library/wa-ajaxintro2/, pp. 1-14.

Middleman: A Vido Caching Proxy Server, Soam Acharya (Inktomi Corporation) and Brian Smith (Cornell University), downloaded May 20, 2013, www.nossdav.org, 10 pages.

How to configure the Proxy Settings to enable Media Streaming, downloaded May 20, 2013, www.eeplace.com, pp. 1-8.

The Citrix ICA file explained and demystified, Ingmar Verheij, Jul. 25, 2012, downloaded May 13, 2013, www.ingmarverheij.com/the-citrix-ica-file-explained-and-demystified/, pp. 1-19.

Wikipedia, H.264/MPEG-4 AVC, downloaded Apr. 26, 2013, en.wikipedia.org/wiki/H.264/MPEG4_AVC, pp. 1-15.

Apr. 27, 2015—(US) Notice of Allowance & Fees Due—U.S. Appl. No. 14/152,114.

"SIP Proxy Server Virtulaization"—Windows 2008 Hyper-V, Microsoft, May 2011, http://testlab.inin.com/compatabilityfiles_exgternal/documents/SIPProxyHyper-v.pdf.

* cited by examiner ered to the Microsoft Corporation of Redmond, Wash.
MULTIMEDIA REDIRECTION IN A VIRTUALIZED ENVIRONMENT USING A PROXY SERVER This application claims priority from U.S. patent application Ser. No. 14/152,114, filed Jan. 10, 2014 (and to grant as U.S. Pat. No. 9,124,668 on Sep. 1, 2015), which claims priority to U.S. Provisional Patent Application Ser. No. 61/825,506, filed May 20, 2013, both of which are herein incorporated by reference in their entireties.

FIELD

Aspects described herein generally relate to multimedia redirection in a virtualized environment using a proxy server.

BACKGROUND

Techniques for instantiating an application in a virtualized environment are well known in the art. Such an application may be instantiated on a virtualization server and a counterpart remoted application may be rendered on a user's computing device, such as a mobile phone, smartphone, tablet, laptop, personal computer, or other electronic device. Communication between the virtualization server and the user's computing device may be facilitated using a remote presentation protocol, such as the Independent Computing Architecture (ICA) protocol and HDX protocol developed by Citrix Systems, Inc. of Ft. Lauderdale, Fla., or the Remote Desktop Protocol (RDP) manufactured by the Microsoft Corporation of Redmond, Wash.

In some circumstances, the aforementioned application may display multimedia content, such as video or audio. Techniques for media redirection may be used to facilitate rendering of the multimedia content at the remoted application. For example, some implementations of HDX MediaStream Flash redirection moves the processing of ADOBE Flash content from MICROSOFT Internet Explorer on a virtualization server to a user's device. By moving the processing to the user's device, media redirection may reduce server and network load, resulting in greater scalability while ensuring a high definition user experience. Similarly, Aero redirection may allow the WINDOWS Aero interface to be used on remote desktops/applications. Likewise, Windows Media redirection may be used to remote a windows media file. In more recent times, HTML5 video streaming has become implemented in some web browser applications. As a result, some developers started using HTML5 for media players, instead of legacy media players. Legacy media players were commonly implemented as external plug-ins: Apple's Quicktime, RealPlayer, Windows Media Player, and Adobe Flash. HTML5 includes tags that some believe will render external plug-ins obsolete.

There remain numerous drawbacks and limitations in the prior art as it relates to multimedia redirection in a virtualized environment.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards a method of redirecting multimedia content using a proxy server. In some embodiments the method may include: a proxy server modifying web content used to display/render multimedia content using predetermined scripting code stored in a computer memory; a proxy server transmitting the modified web content to an instantiated application in a virtualized environment on a virtualization server for execution by the instantiated application; a proxy server receiving from the instantiated application information (e.g., the location from which multimedia content may be downloaded) that is associated with overridden methods executed from the stored scripting code; a media player (in lieu of the instantiated application) retrieving the multimedia content and other information; and transmitting, using a remote presentation protocol, the redirected multimedia content and other information for rendering at a user's computing device. The instantiated application may comprise an operational sandbox within which the application confines execution of scripting code.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards multimedia redirection in a virtualized environment using a proxy server. The proxy server may store scripting code that may be injected into web content retrieved from a content resource server. The injected scripting code may cause an instantiated application in the virtualized environment to intercept/override at least some method calls in the web content. The proxy server may receive information about where to obtain multimedia content and when to display/render it, and then send the redirected multimedia content and other information to a client agent application (e.g., CITRIX® RECEIVER™) executing on a user's computing device for rendering.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition, multimedia content may refer to audio/video (e.g., audio/video streams) that can be displayed/rendered to a user computing device. Meanwhile, web content may refer to any content sent and received using the HTTP protocol (or other comparable protocol) with a web browser (or other comparable application). Thus, web content may comprise multimedia content, as well as HTML content that specifies the resources (e.g., HTML5 video and other tags/elements) on a given webpage and application logic in the form of code written in a scripting language (e.g., Javascript) that controls these resources.

Computing Architecture.

Figure 1:
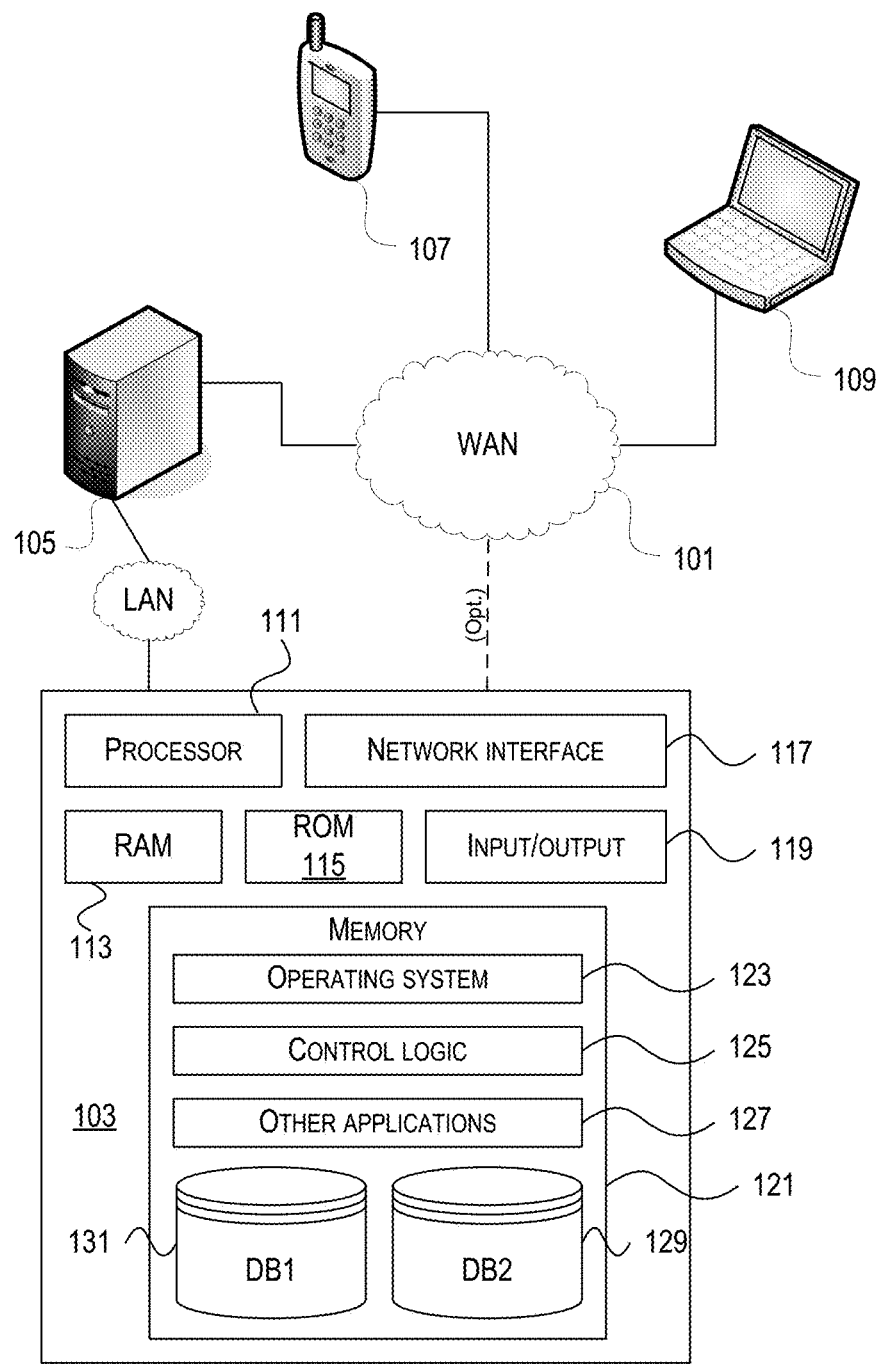
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. In some examples, the web server 105 and/or data server 103 may be referred to as a resource server (or content resource server) because they provide content in response to an appropriately formatted request (e.g., a HTTP request). Client computers 107, 109 may be used in concert with data server 103 to access data stored therein, or may be used for other purposes. For example, from client device 107 a user may access resource/web server 105 using an Internet browser, as is known in the art, or by executing a software application that communicates with a resource server (e.g., web server 105 and/or data server 103) over a computer network (such as the Internet).

Servers and applications may be combined on the same physical machines, and retain separate virtual or logical addresses, or may reside on separate physical machines. FIG. 1 illustrates just one example of a network architecture that may be used, and the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. The functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
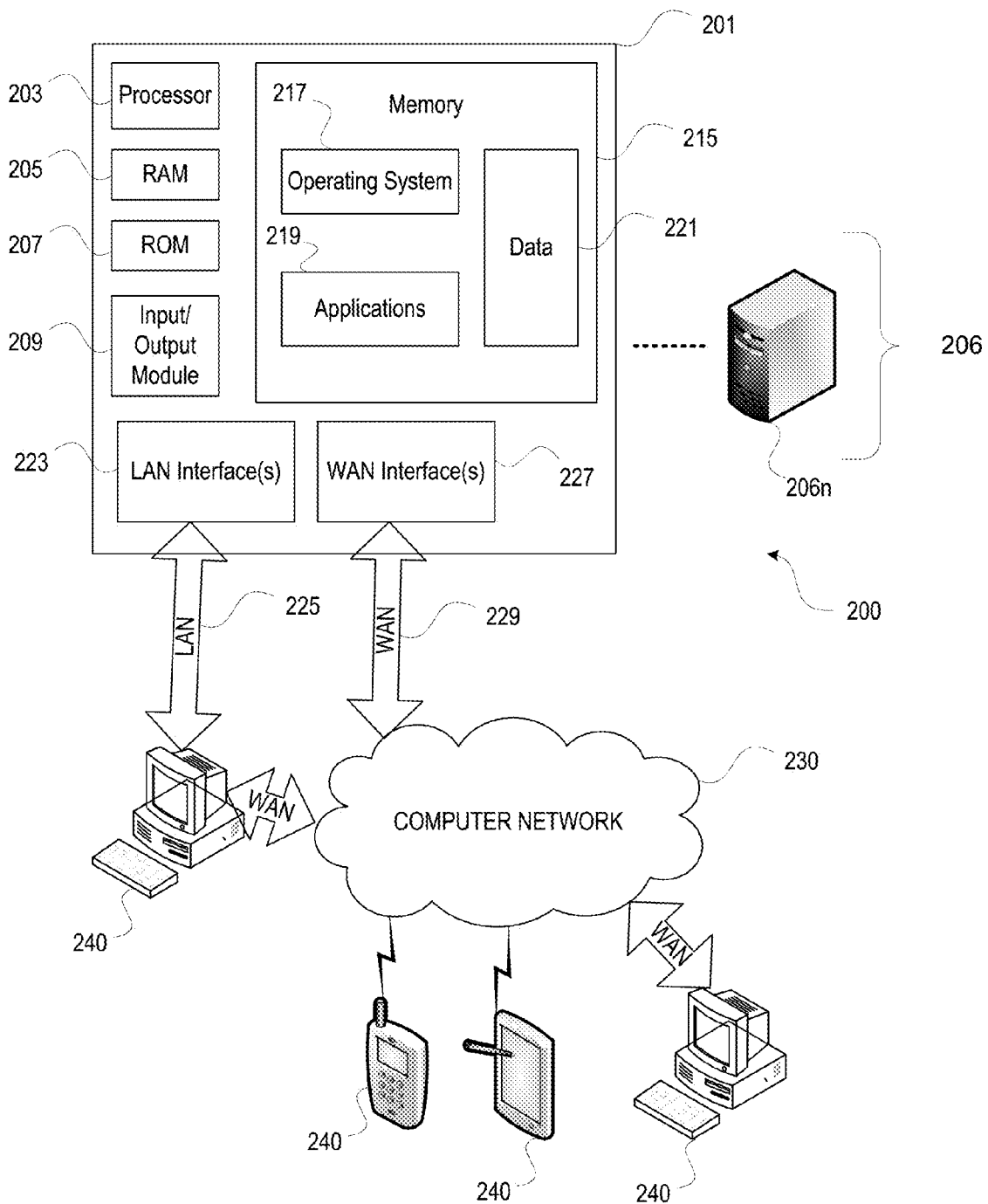
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. Alternatively, generic computing device 201 may, in some examples, be referred to as a user computing device (e.g., computing device 201, terminals 240, mobile terminals/devices, mobile phones, smartphones, PDAs, tablets, notebooks/laptops, personal computers, and others). The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
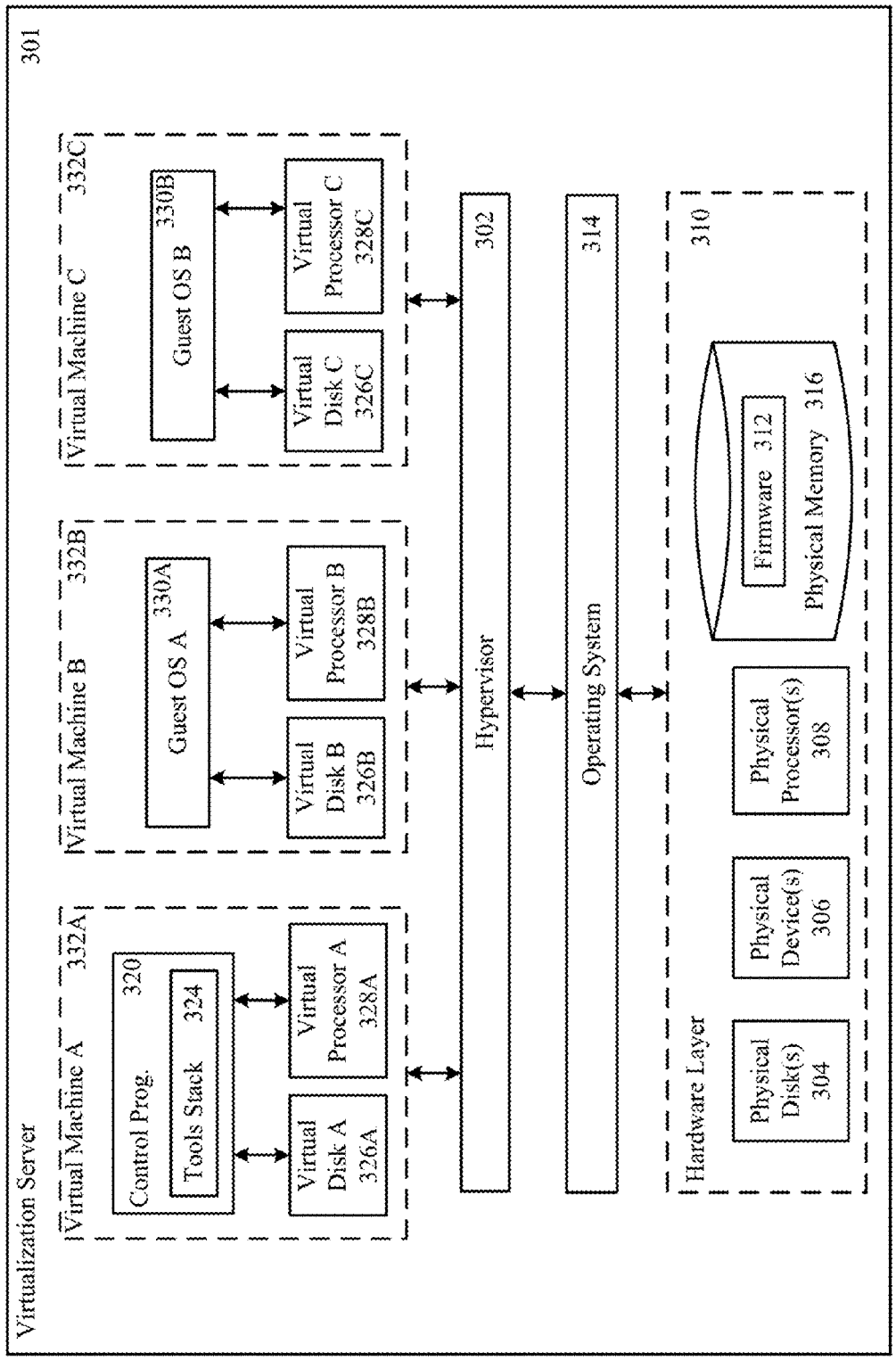
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
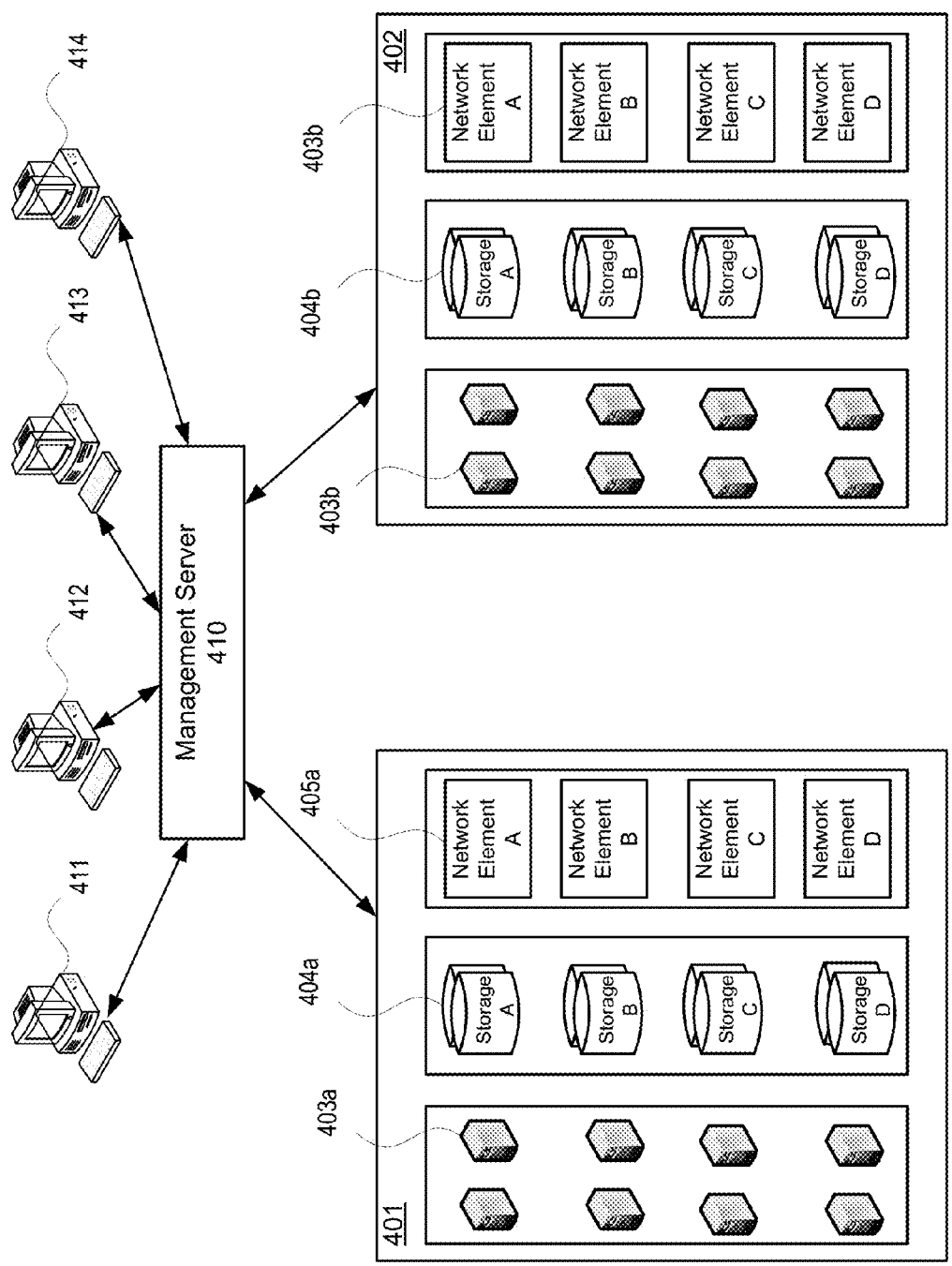
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Figure 7A:
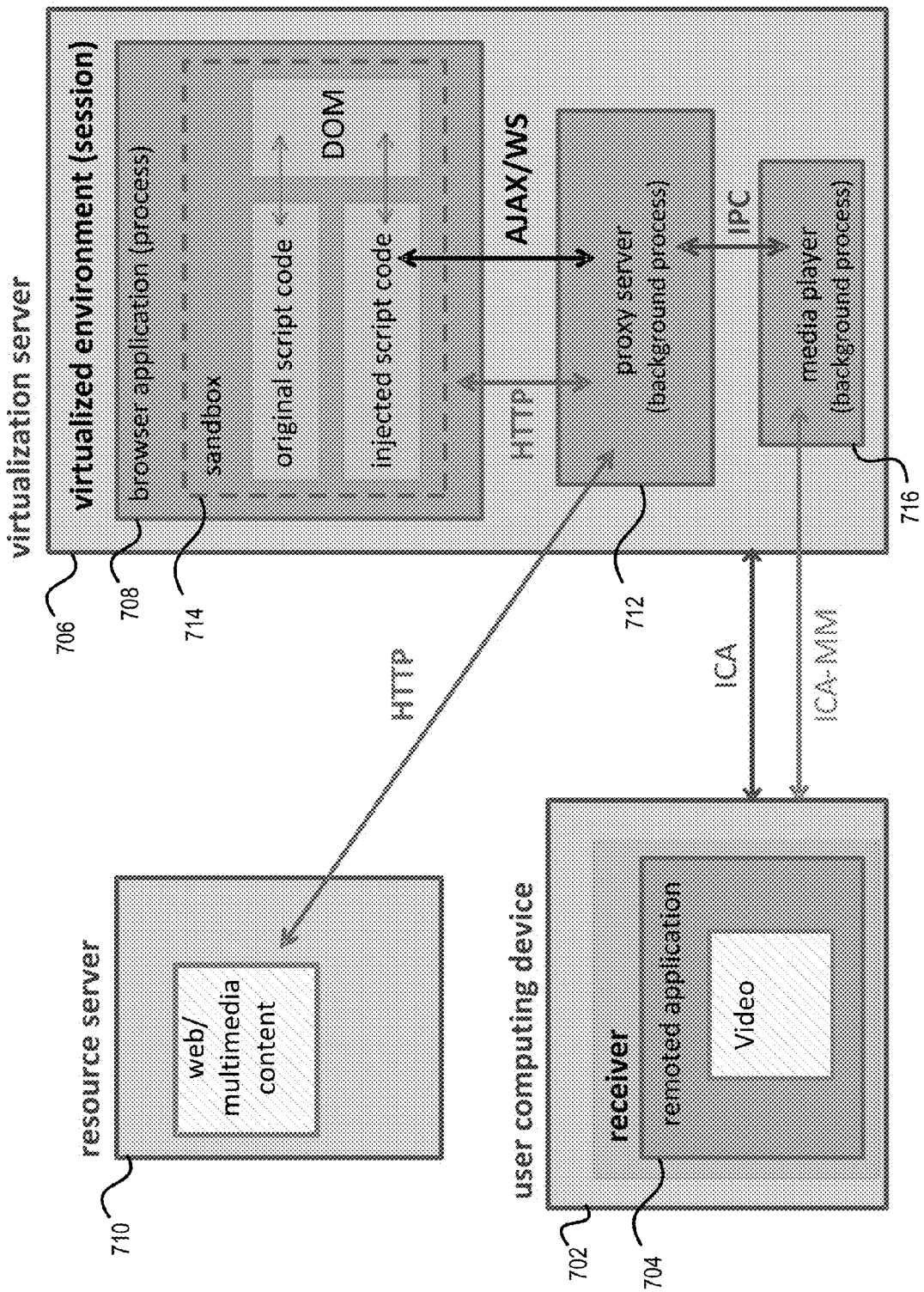
FIGS. 7A, 7B, and 7C illustrate examples of different configurations of a computerized system in accordance with one or more illustrative aspects described herein.

FIG. 7A illustrates one example of a computerized system in which multimedia content may be redirected, in accordance with various aspects of the disclosure, to a remoted application 704 running in a user computing device 702. The user computing device (e.g., device 240) may execute a virtual machine client agent program/application to display the output of the remoted application in an application window, a browser, or other output window on the user computing device 702. The output of the remoted application may correspond to that of an application 708 remotely executing on a virtualization server (e.g., server 206) or other remotely located machine. In one example, the remoted application may be a web browser, such as MICROSOFT INTERNET EXPLORER, GOOGLE CHROME, NETSCAPE FIREFOX, APPLE SAFARI, or other Internet browsers. In other examples, the remoted application may be an application that plays Adobe flash multimedia content, an application that plays Windows media (.wmf) files, or various other non-browser applications that display multimedia content.

Computer-executable instructions (e.g., software, firmware, or other logic programming) may be stored in one or more memories (e.g., non-transitory computer-readable media) in the various devices illustrated in the system of FIG. 7A. The computer-executable instructions may assist a user computing device 702 to connect, using a remote presentation protocol (e.g., independent computing architecture (ICA) protocol, CITRIX HDX protocol, or other protocols), to an instantiated application 708 in a virtualized environment hosted at a virtualization server 706. For example, the ICA protocol has been used in products such as, but not limited to CITRIX XenApp and XenDesktop to separate application logic (which may run on a remote system 706, sometimes in a datacenter) and presentation logic (on the client device 702). The ICA protocol may send input from the client device (e.g., keyboard, mouse, audio, etc.) to a remote system 706 and receives output (e.g., video, sound, etc.) from a remote system 706 over a network. On the client device 702, a software module (e.g., CITRIX® RECEIVER™) may be used to handle this remote presentation protocol traffic. In some embodiments, based on the amount of distribution desired, the application logic and presentation logic may reside on the server and client, respectively; however, in alternate embodiments, the application logic may span across both the server and client, thus offsetting more of the workload and processing responsibility to the client machine. Although the accompanying figures illustrate a particular distribution of logic between the server and client machines, the disclosure contemplates varying levels of distribution between the various system components.

The remoted application 704 at the user computing device 702 may request web content on a resource server 710 (e.g., web server 105). The request may include a uniform resource locator (URL) entered into an address field of a remoted web browser application 704. In some examples, the instantiated application 708 on the virtualized server 706 may receive and route through the proxy server 712 the request (e.g., HTTP request) for web content to the resource server 710 corresponding to the URL.

In some examples the retrieved web content may comprise data formatted in accordance with the hypertext markup language version 5 (HTML5) standard. HTML5 includes elements for drawing graphics, adding media content, better page structure, better form handling, and several APIs to drag/drop elements, finding geo-location, including web storage, application cache, integration of scalable vector graphics content to supplant/supplement the <object> tag, and other elements. For example, the HTML5 "canvas" tag/element may be used to draw graphics, on the fly, via scripting (usually JavaScript). Since the canvas element is a container for graphics, scripting code may be used to actually render/draw the graphics. For example, "drawImage (image,x,y)" is method on the canvas element for drawing an image at the given x-axis, y-axis coordinate. Moreover, the canvas element has several methods for drawing paths, boxes, circles, characters, and adding images. Similarly there are also HTML5 tags for <audio>, <video>, <source>, <embed>, and <track>. The source element/tag defines multiple media resources for the <video> element and/or <audio> element. The embed element/tag defines a container for an external application or interactive content, such as a plug-in. In general, these elements and features make it easier to include and handle multimedia and graphical content on the web without necessarily resorting to proprietary plugins and APIs. HTML5 video may permit video to be shown on a web browser without requiring numerous cumbersome plugins.

In addition, in some embodiments in accordance with various aspects of the disclosure, the retrieved web content (e.g., an HTML5 webpage) may include scripting code (e.g., JavaScript) that dynamically creates a multimedia tag/element, such as a video or audio tag. For example, the scripting code may dynamically create the tag in response to a user input. In other words, the document object model (DOM) of the web content might not include the later-created video/audio tag when the web content was first downloaded to the proxy server 712, 718 from the resource server 710. However, when the aforementioned scripting code is triggered by a user action (e.g., a button click), a video/audio tag may be created in the DOM of the web page. The disclosure contemplates a system that is appropriately designed to respond accordingly. For example, the injected scripting code may continue to override the appropriate method in the DOM, and upon the creation of the video tag/element in the DOM of the webpage, the injected code may respond appropriately. In other words, the injected Javascript overrides the methods of the appropriate HTML tags when it is executed by the browser on the virtual desktop. Thus this disclosure contemplates web content that, at run-time, dynamically generates multimedia tags directed at the display/rendering of multimedia content.

In response to the proxy server 712 sending a request (e.g., HTTP request corresponding to a URL/URI) for multimedia content to the resource server 710, the resource server 710 may return multimedia content (e.g., HTML5 file) to the proxy server 712. Numerous types of proxy servers with various features are known in the art and this disclosure contemplates their use in the various system configurations described herein. In some examples, the proxy server 712, 718 may be a type of proxy that is responsible for answering client requests, but does not store any substantial data; these types of proxy function similar to web browser plug-ins. In other examples, the proxy server 712, 718 may include a caching/storage feature (e.g., a storage proxy) to cache in memory a HTML5 file received from the resource server. Later requests for the same HTML5 file may result in the proxy server assessing whether the cached file is stale and serving the cached file upon confirmation of its freshness. Moreover, in some examples, actual audio and/or video data may be cached at the proxy server 712, 718. The memory requirements for caching video and/or audio data may be large. In alternate embodiments, such caching may occur to accommodate streaming video and/or audio in that a time window of a predetermined size may be buffered at the proxy server. As such, the storage strain on the proxy server may be alleviated.

After receipt of the web content (e.g., HTML5 file) from the resource server 710, the proxy server 712 may alter the web content to intercept particular method calls that are executable on the multimedia content by the instantiated application 708 in the virtualized environment. For example, the audio tag/element in HTML5 includes a play( ) method that starts the playback of audio content identified in the audio tag. In some examples, such as the system illustrated in FIG. 7A, the instantiated application 708 may interface with the document object model (DOM) of the HTML5 file to intercept and/or override existing method calls. For example, the proxy server 712 may store computer-executable instructions (e.g., Javascript code or other script code) that it may inject into the web content (e.g., HTML5 file) to interact with the DOM of the received content. As a result, the instantiated application 708 may, using the injected script code that is hooked onto the DOM, intercept particular method calls and transmit information associated with those intercepted method calls to the proxy server 712. For example, when the play( ) method on the audio tag in HTML5 is hooked, the information associated with that intercepted method may include the URL/URI that corresponds to the audio tag and other attributes of the audio tag. Although the preceding examples included the play( )method, the disclosure contemplates more, other, or all methods/attributes on the DOM to be hooked, assuming they are capable of being overridden/monitored. For example, the "document.getElementbyId( )" method may be used to allow Javascript scripting code to get access to every element in the DOM and hook as appropriate.

The aforementioned information associated with that intercepted method may be transmitted from a sandbox 714 (e.g., operational sandbox) to the proxy server using one or more asynchronous scripting technologies, such as asynchronous Javascript (AJAX), Websockets (WS), or others.

An operational sandbox may sometimes be referred to as a security sandbox or execution sandbox. The instantiated application 708 may comprise a sandbox 714 within which the application confines execution of scripting code. This disclosure contemplates sandbox 714 to cover any situation where the instantiated application 708 may restrict the capabilities of or access to particular resources or features of the instantiated application 708 for security or other purposes. In the example of a web browser application, numerous web browser products implement an operational sandbox to limit execution of Javascript code by the web browser to only that Javascript code which originates from a particular domain or sub-domain. Similarly, APPLE implements a sandbox with respect to execution of computer-executable instructions in its iOS products (e.g., APPLE iPHONE, etc.) The concept of a sandbox is well known in the art.

Figure 7B:
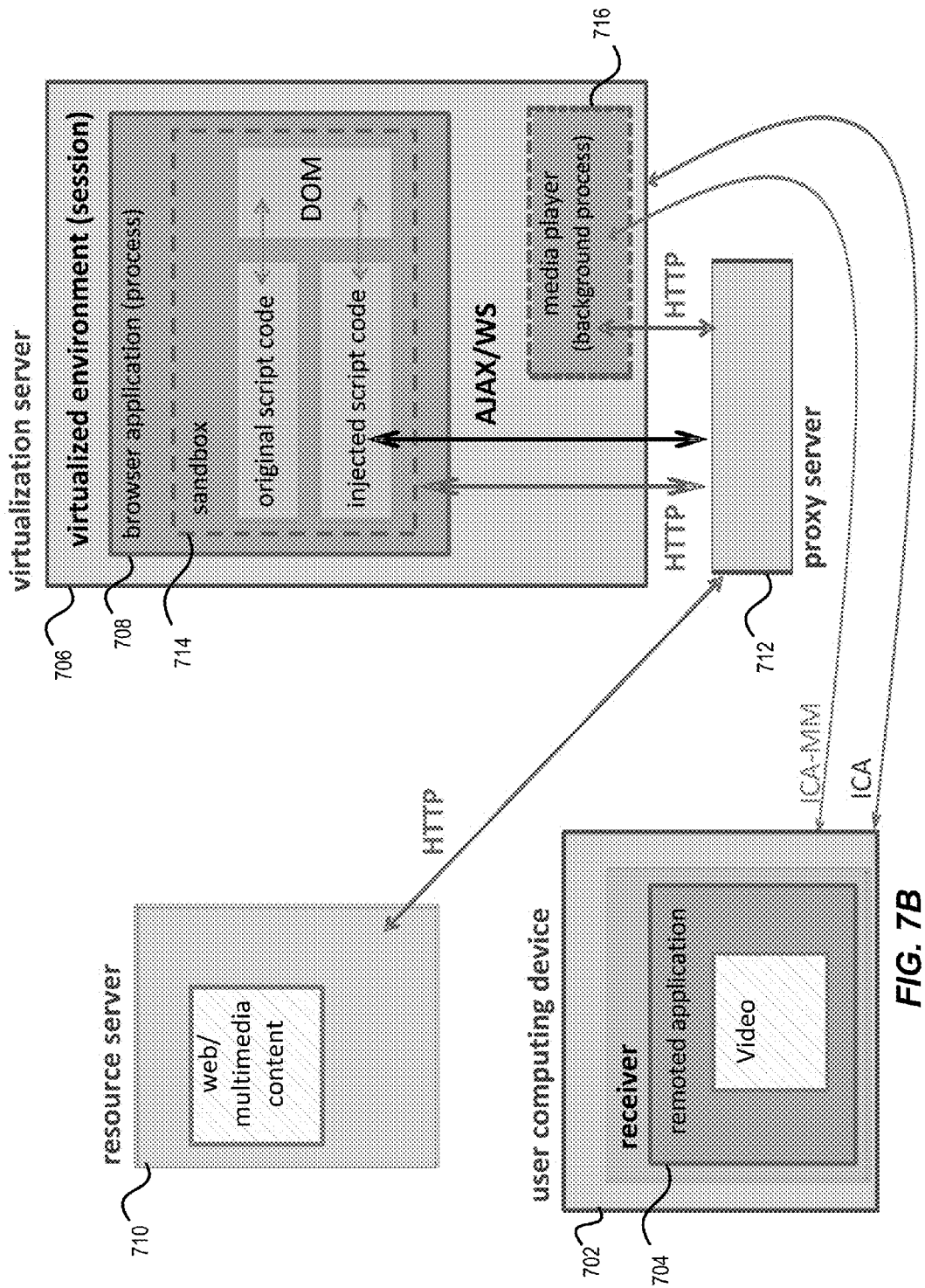
Figure 7C:
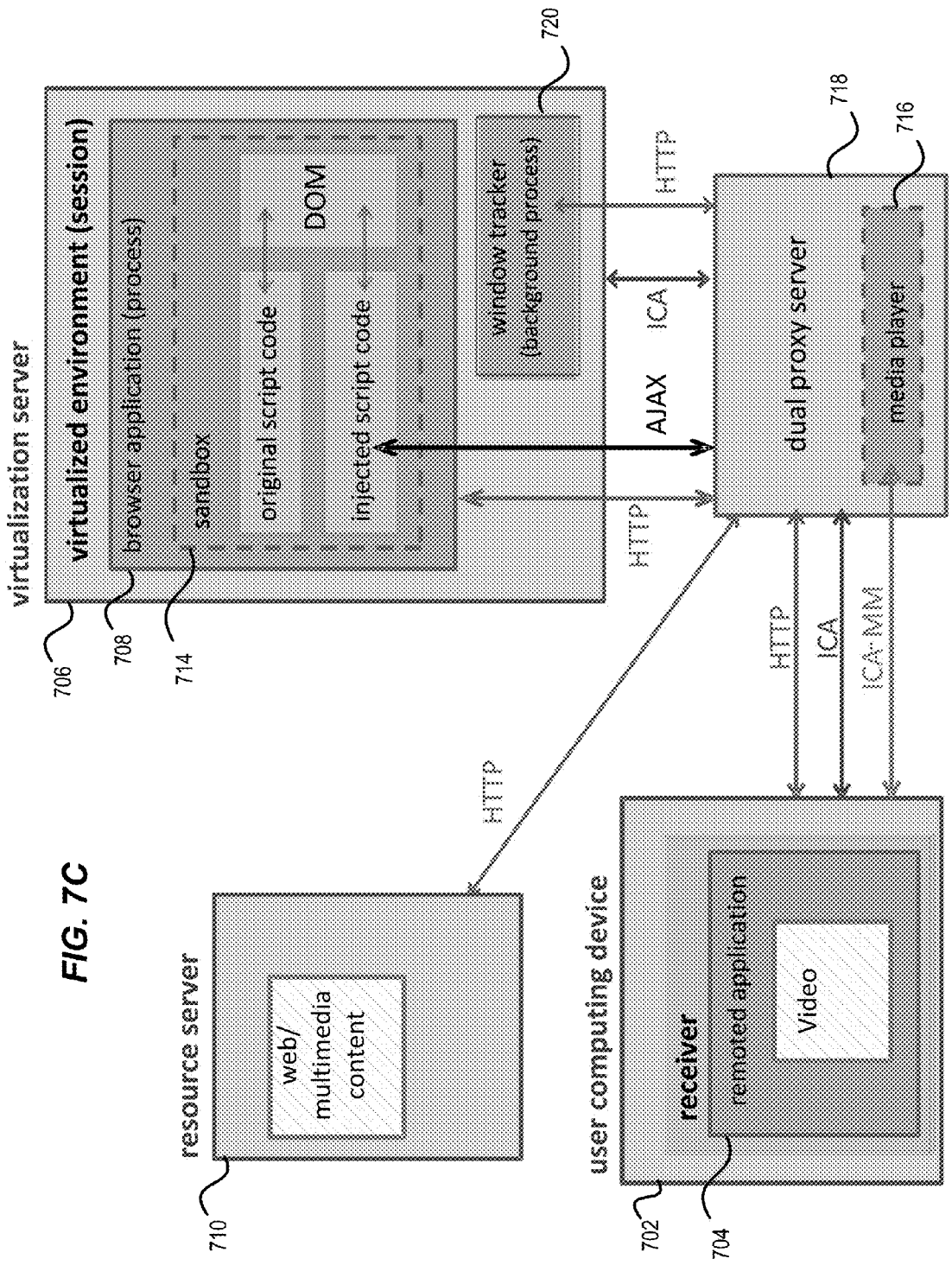

Continuing with the preceding example regarding AJAX for communicating between the sandbox 714 and the proxy server 716, the disclosure uses a proxy server 717, 718 to overcome the restrictions created by a Javascript sandbox 714. To elaborate, the configuration of the system components, as illustrated in FIGS. 7A, 7B, and 7C, demonstrates that communication between the virtualization server 706 and the resource server 710 with respect to requesting the web content is through a proxy server 716, 718. As such, the configuration overcomes the restrictions created by a Javascript sandbox. Moreover, the proxy server 716, 718 is situated such that it may inject Javascript code into the sandbox 714 for execution alongside the original script code and other elements in the DOM received from the resource server 710. As such, the disclosed configurations create a seamless, efficient implementation.

Finally, the aforementioned information associated with that intercepted method may be included in a remote presentation protocol communication channel (e.g., an ICA/ICA-MM communication channel) to the virtual machine client agent for execution and output by the user computing device 702. In some alternate examples, the aforementioned information may be included in an HTTP communication channel, if one exists, between a proxy server 718 user computing device 702. ICA/ICA-MM and HDX are known CITRIX protocols commonly used for media redirection. Unlike predecessor technologies, which merely sent bitmaps (e.g., screenshots) of an application running in a virtualized environment to a client agent application, media redirection in accordance with various aspects of this disclosure involves redirecting multimedia (e.g., video and/or audio) directly to the client agent application. The multimedia might not be rendering at the virtualization server. Instead, known protocols may be used to redirect the multimedia content to the client agent application for rendering. With the development of HTML5, there remains room for improvement of prior art media redirection technologies to accommodate particularities in HTML5 tags/elements and playback of HTML content.

Although the preceding examples describe using Javascript, a DOM, and AJAX, the disclosure is not so limited. The disclosure contemplates that computer-executable instructions written in other than Javascript may be used to interact/interface with and intercept functions being performed with the multimedia content. Moreover, the disclosure also contemplates that a Javascript-compatible DOM may be absent in some types of multimedia content, and that the content may be organized using a model or structure comparable, but not the same as a DOM. The method steps and system components/modules described herein contemplate a proxy server 712 that provides the appropriate type of computer-executable instructions to create hooks into the elements/tags/characteristics/attributes of the web content such that dynamic modifications to the content can be captured and forwarded to a client-side agent for execution. For example, in an example where the web content includes Adobe Flash (e.g., ".swf" file), the computer-executable instructions configured to hook into the content may be written in ActionScript. Similarly, Silverlight multimedia content may be intercepted using the appropriate scripting languages.

Numerous variations to the system configuration illustrated in FIG. 7A are contemplated by the disclosure. Assume, only for the purpose of illustration of the various contemplated variations of the system, that the proxy server 712 in FIG. 7A is not a dual proxy (or multi-proxy) server, and thus it serves as a proxy for HTTP traffic (or some other protocol traffic if the communication protocol used by the resource server 710 is other than HTTP) without also serving as a remote presentation protocol proxy (e.g., ICA proxy). (Meanwhile, the proxy server 712 described in FIG. 7C below illustrates a dual proxy 718 (or multi-proxy) capability.) In the case of the HTTP proxy server in FIG. 7A, the virtualization server 706 may also instantiate a media player 716 to send the multimedia content and information associated with the intercepted method calls to the remoted application 704 on the user computing device 702. In one example, the media player 716 may be based on CITRIX DIRECTSHOW or MEDIA FOUNDATION libraries, and may re-use existing CITRIX HDX protocol for Windows media redirection. The media play 716 may include one or more of the components/modules illustrated in FIG. 5.

Figure 5:
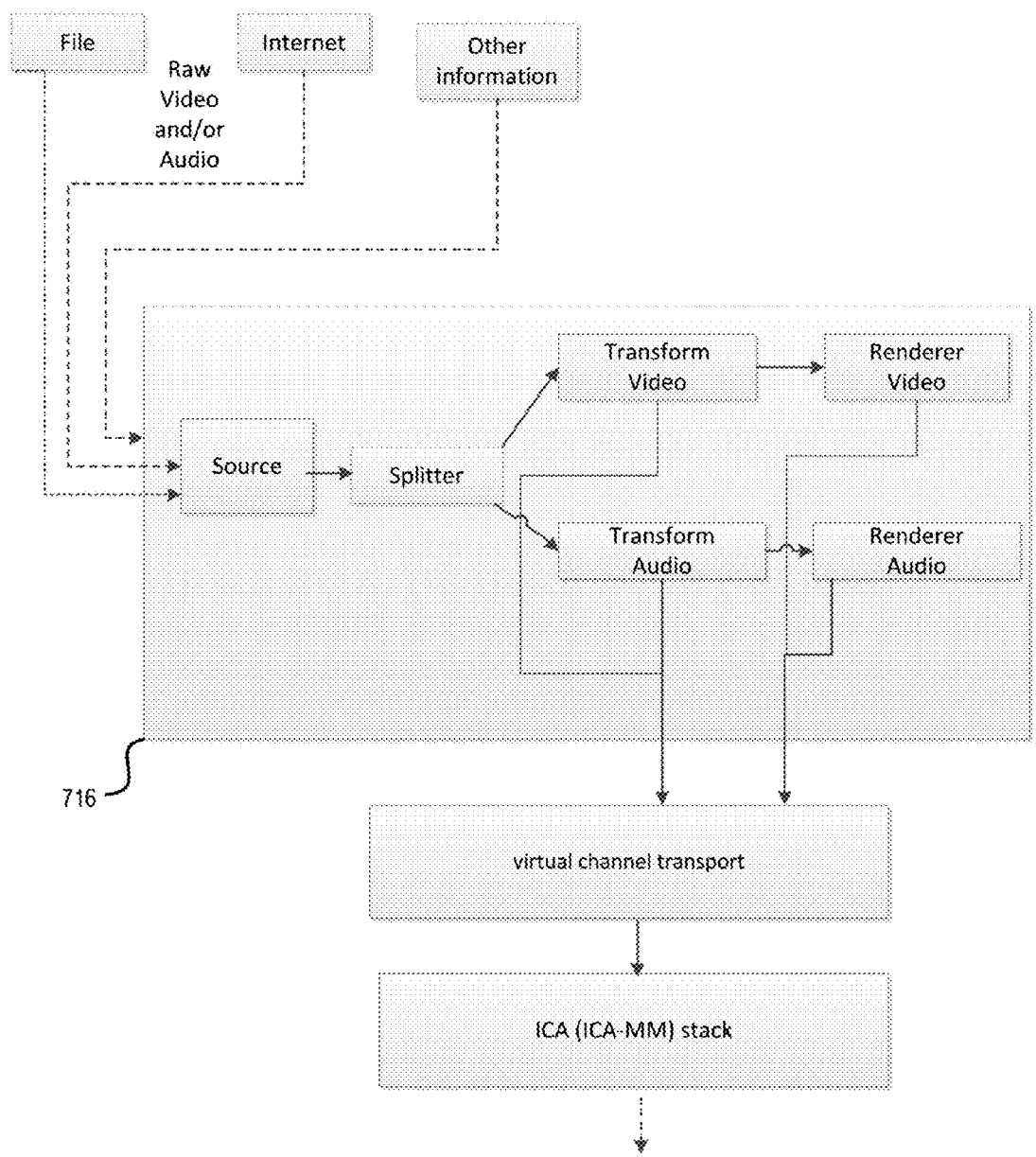
FIG. 5 depicts an illustrative server-side component architecture for processing data sent via a remote presentation protocol in accordance with one or more illustrative aspects described herein.

The media player 716 may receive the location of multimedia content (e.g., audio and/or video) and the information associated with the intercepted method calls, and package it (e.g., as shown in FIG. 5) in accordance with a remote presentation protocol. In one example, the web content intercepted by the proxy server may include HTML5 video tags, the intercepted method call may be the load( ) method on the HTML5 video tag, and the information associated with the intercepted load( ) method may include the URL of the video content to load and any other input parameters provided for the load( ) method. The multimedia content (e.g., video) and the method parameters (e.g., commands) may be retrieved by the media player and sent via the remote presentation protocol to the client agent at the user computing device 702.

In some examples, the remote presentation protocol (e.g., ICA protocol) used to communicate multimedia content to the user computing device 702 may be extended to include an ICA-MM (multimedia) feature to allow for the incorporation of the additional information associated with the intercepted method calls. The resulting ICA-MM stack that is outputted by the media player 716 may be transported to a virtual machine client agent to be processed, decompressed, and/or decoded, and then rendered for display. A person skilled in the art will recognize the independent computing architecture (ICA) protocol, the ICA-MM protocol, and the CITRIX HDX protocol, upon which the ICA and ICA-MM protocols are based, and appreciate that the HDX protocol may be used for passing screen elements and events that occur on the screen from a virtualized environment down to a user's computing device. However, the remote presentation protocol described herein allows for the additional information associated with the intercepted method calls to be incorporated into the ICA-MM (or other protocol) stack for transmission by the media player 716.

Continuing with the preceding example, in the illustrative system configuration of FIG. 7A, inter-process communication (IPC) between the media player 716 and the HTTP proxy server 712 may be used to synchronize the various processes/threads being concurrently executed in the background processes of the virtualization server 706. In an alternate embodiment contemplated by the disclosure, the IPC may be implemented using HTTP communication. For example, as illustrated in FIG. 7B, the media player 716 may execute in the virtualized environment in the virtualization server 706, but the proxy server 712 may be configured as a standalone appliance/server. Assuming the proxy server 712 communicates using HTTP with the resource server, the HTTP proxy server 712 may use HTTP communication to synchronize and coordinate the various processes/threads being concurrently executed among the media player 716 and the HTTP proxy server 712.

In yet another example illustrating the various system configurations contemplated by the disclosure, in FIG. 7C the interaction between the proxy server 718 and user computing device 702 may be different from that illustrated in FIGS. 7A and 7B. In FIG. 7C, the proxy server 718 may be a dual proxy (or multi-protocol proxy) capable of proxying via a remote presentation protocol (e.g., ICA or ICA-MM) as well as other protocols (e.g., hypertext transfer protocol (HTTP)). The dual proxy server 718 in FIG. 7C may directly receive the request from the user computing device 702 to connect via a remote presentation protocol (e.g., ICA) to a virtualized environment. Unlike the illustrative system in FIG. 7B, since the proxy server in FIG. 7C includes remote presentation protocol (e.g, ICA) proxy server capabilities, the virtual machine client agent in the user computing device 702 may connect directly through the dual proxy server 718 en route to the virtualization server 706. As a result, ICA/ICA-MM communication to/from the user computing device may pass through the dual proxy server 718 as illustrated in FIG. 7C. In some embodiments, the dual proxy server 718 may be referred to as a branch repeater or netscaler (e.g., network load balancer) product.

Furthermore, similar to FIG. 7B, since the proxy server 718 in FIG. 7C includes HTTP proxy server capabilities, the various system components (e.g., resource server 710, user computing device 702, and virtualization server 706) may communicate with the HTTP proxy server 718 for different purposes using HTTP protocol. For example, in some embodiments including client-side (i.e., user computing device 702) fetching, the virtual machine client agent in the user computing device 702 may fetch multimedia content (e.g., video) via a HTTP connection with the dual proxy server 718. In addition, similar to the inter-process communication (IPC) features described above with respect to the system configuration of FIG. 7A, a window tracker 720 process may communicate via HTTP with the dual proxy server 718 to synchronize the processes/threads being concurrently executed between the virtualized environment and the media player 716. In other words, the window tracker 720 background process may track/monitor the coordinate location and size of a video output box to be displayed by the user computing device 702. The window tracker 720 process may communicate this information via a HTTP communication channel to the dual proxy server 718.

In the preceding example involving a dual proxy server 718, in FIG. 7C a media player 716 may be instantiated separate and apart from the dual proxy server 718 to send the multimedia content and the information associated with the intercepted method calls to the remoted application 704 on the user computing device 702. The media player 716 may include one or more of the components/modules illustrated in FIG. 5. The media player 716 may receive the location (e.g., URL) of multimedia content (e.g., audio and/or video) and the information associated with the intercepted method calls, retrieve it, and package it in accordance with a remote presentation protocol. In some examples, the remote presentation protocol (e.g., ICA protocol) may be extended to include an ICA-MM (multimedia) feature to allow for the incorporation of the additional information associated with the intercepted method calls.

The media player 716 may transmit the multimedia content, in a format according to a remote presentation protocol (e.g. ICA), to a remoted application 704 executing in a virtual machine client agent. Upon receipt, the remoted application 704 executing inside the virtual machine client agent application may process the commands received through the remote presentation protocol (e.g., ICA-MM) connection. The virtual machine client agent at the user computing device 240 may decode and/or decompress the multimedia content received through the connection, and the remoted application 704 may render it on a display/through speakers communicatively coupled to the user computing device 204. The client agent may include one or more of the components/modules illustrated in FIG. 6 to implement the remote presentation protocol.

Figure 6:
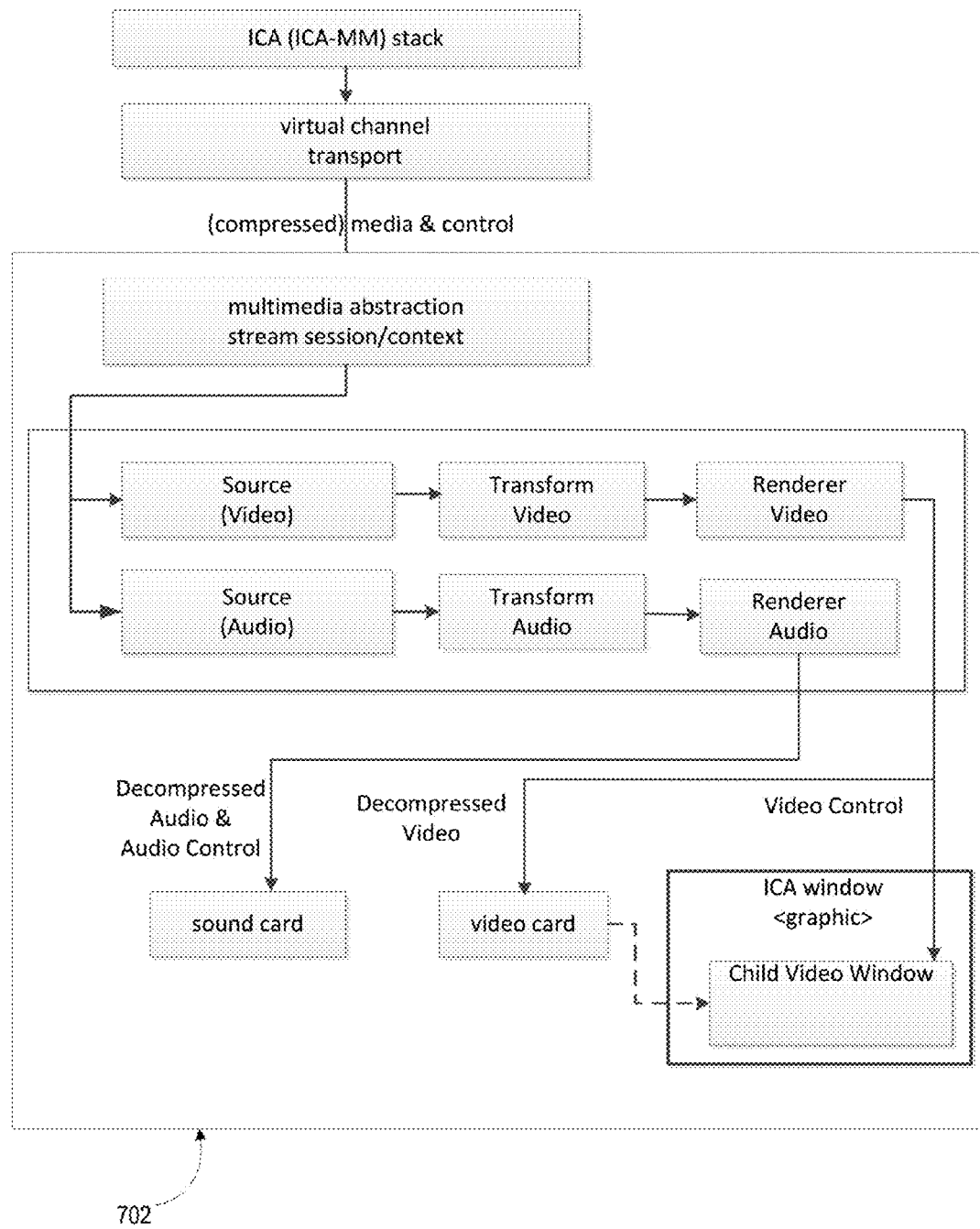
FIG. 6 depicts an illustrative client-side component architecture for processing data received via a remote presentation protocol in accordance with one or more illustrative aspects described herein.

FIG. 6 depicts an illustrative client-side component architecture for processing data received via an ICA or ICA-MM connection, which are protocols based off the CITRIX HDX mediastream protocol. To maximize efficient use of network bandwidth as well as server CPU usage, in some examples, the ICA-MM connection may transmit data in a compressed, undecoded format so that the client-side components may decode and decompress the multimedia content. Another benefit of such a configuration may include enhanced quality of the multimedia content because it avoids having to decompress and recompress the content at the server-side with a possibly lower-quality and/or less efficient compression algorithm (e.g., a JPEG compressor). Although not expressly shown in FIG. 6, information associated with the method calls intercepted by the proxy server 712, 718 may also be incorporated into the incoming compressed traffic. This information may be used by the source video and audio components shown in FIG. 6 to control the resulting video and/or audio output.

Figure 8:
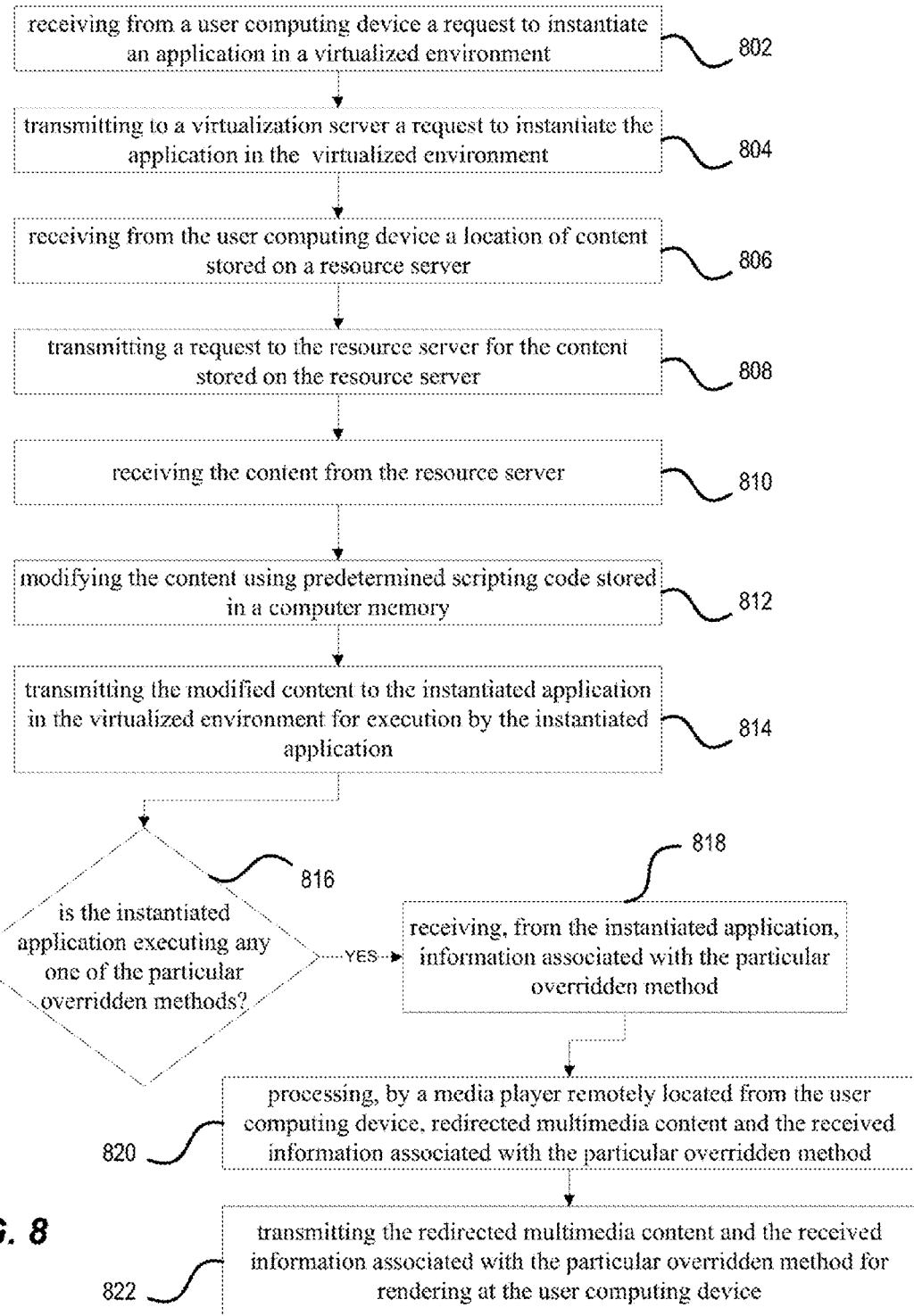
FIG. 8 is a flowchart of illustrative steps that may be performed by a proxy server in accordance with one or more illustrative aspects described herein.

Regarding FIG. 8, the flowchart illustrates one example of some steps 802, 804, 806, 808, 810, 812, 814, 816, 818, 820, 822 that may be performed by an illustrative proxy server in accordance with various aspects of the disclosure. In one example, the illustrative proxy server may be a dual proxy server 718 such as in FIG. 7C. As explained above, as a result of such a proxy server 718 being able to proxy both HTTP protocol traffic as well as remote presentation protocol (e.g., ICA/ICA-MM protocol) traffic, the proxy server 718 may perform steps where it communicates directly with the user computing device 702. For example, in step 802, the proxy server 718 may receive from a user computing device 702, a request to use an existing remote presentation protocol (e.g., ICA) connection (or to create a new ICA connection) to instantiate an application (e.g., a web browser application) in a virtualized environment on a virtualization server 706. However, in an alternate embodiment in accordance with various aspects of this disclosure, a virtualization server 706 may directly receive the request from the user computing device 702 and instantiate the application in the virtualized environment such that the instantiated application is configured to use the proxy server 712 as an HTTP proxy.

In addition, in steps 822 and 824, the dual proxy server 718 may include a media player 716 that processes and directly transmits remote presentation protocol (e.g., ICA/ICA-MM) traffic to a virtual machine client agent at the user computing device 702. While the aforementioned steps, inter alia, are specific to the capabilities of a dual proxy (or multi-proxy) server 718, this disclosure also contemplates that the steps illustrated in FIG. 8 may be adjusted to accommodate a non-dual proxy server 712. For example, as illustrated in FIG. 7A and FIG. 7B, the user computing device 702 may communicate via a remote presentation protocol with a virtualization server 706, but the proxy server 712 may interact with the instantiated application 708 and media player 716 to facilitate the eventual communication of the appropriate multimedia content and other information to the user computing device 702.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A proxy server communicatively coupled with a content server and an instantiated application in a virtualized environment on a virtualization server, the proxy server comprising:
   a computer processor; a computer memory storing computer-executable instructions that, when executed by the computer processor, cause the proxy server to:
   send a request for web content to the content server; override at least one element in the web content received from the content server; and inject scripting code stored in the computer memory of the proxy server into the received web content, wherein the stored scripting code is configured to cause the instantiated application to send information associated with the at least one overridden element to the proxy server, wherein the information comprises at least a location of multimedia content; and a media player receiving at least the location of the received web content and transmitting at least multimedia content using a remote presentation protocol to a client agent application at a user computing device, wherein the virtualization server hosts at least the instantiated application in the virtualized environment, wherein the instantiated application comprises an operational sandbox within which the instantiated application confines execution of the stored scripting code injected into the received web content.

2. The proxy server of claim 1, wherein the proxy server is located at a standalone appliance device in communication with the virtualization server and user computing device.

3. The proxy server of claim 1, wherein the media player is instantiated at a same physical server computer as the proxy server.

4. The proxy server of claim 1, wherein the proxy server is configured to process HTTP traffic, but not configured to process traffic formatted in the remote presentation protocol, and wherein the proxy server is directly inaccessible to the user computing device.

5. The proxy server of claim 1, wherein the proxy server is configured to process HTTP traffic and traffic formatted in the remote presentation protocol, and wherein the proxy server is in direct communication with the user computing device.

6. The proxy server of claim 1, wherein the information associated with the executed one of the at least one overridden element comprises an input parameter to a tag in the web content including a uniform resource locator corresponding to multimedia content.

7. The proxy server of claim 1, wherein the web content is formatted using at least one of: at least one of a video tag, an audio tag, and a canvas tag, and scripting code configured to dynamically create at least one of a video tag, an audio tag, and a canvas tag.

8. The proxy server of claim 1, wherein the remote presentation protocol comprises ICA protocol.

9. The proxy server of claim 1, wherein the media player is remotely located from the user computing device and is instantiated at the virtualization server.

10. The proxy server of claim 1, wherein the media player is instantiated at a standalone appliance device in communication with the virtualization server and the user computing device.

11. The proxy server of claim 1, wherein the instantiated application is configured to use the proxy server as an HTTP proxy.

12. The proxy server of claim 1, wherein the computer memory of the proxy server further stores computer-executable instructions that, when executed by the computer processor, cause the proxy server to:
receive from the user computing device a request to instantiate the application in the virtualized environment; and
transmit to the virtualization server the request to instantiate the application in the virtualized environment.

13. A method involving a computing system comprising at least a proxy server, a media player, and a virtualization server, wherein an application in a virtualized environment hosted by the virtualization server is communicatively connected to a user computing device through a remote presentation protocol, the method comprising:
receiving, by the proxy server, web content requested by the application in the virtualized environment in response to a request from the user computing device; modifying the web content to intercept at least one method call that is executable on the web content by the application in the virtualized environment; intercepting the at least one method call; transmitting information associated with the intercepted at least one method call; and causing to render at the user computing device, using the connection established using the remote presentation protocol, multimedia content identified by the web content and the information associated with the intercepted at least one method call, wherein the information associated with the intercepted at least one method call comprises input parameters to tags in the web content including an uniform resource locator corresponding to multimedia content, wherein the web content is formatted as tags including at least one of: at least one of a video tag, an audio tag, and a canvas tag, and scripting code configured to dynamically create at least one of a video tag, an audio tag, and a canvas tag, and wherein the application comprises an operational sandbox within which the application confines execution of scripting code injected into the web content.

14. The method of claim 13, comprising:
transmitting at least the multimedia content, by the media player, to a client agent application at the user computing device using the connection created by the remote presentation protocol.

15. The method of claim 13, wherein the proxy server is configured to process HTTP traffic, but not configured to process traffic formatted in the remote presentation protocol.

16. The method of claim 13, wherein the proxy server is configured to process HTTP traffic and traffic formatted in the remote presentation protocol.

17. One or more non-transitory computer-readable media storing computer-executable instructions that, when executed by one or more processors, cause a computing system comprising a proxy server, a media player, a virtualization server, a resource server, and a user computing device, to perform steps comprising:
receiving from the user computing device a request to instantiate an application in a virtualized environment at the virtualization server; receiving from the user computing device a location of web content stored on the resource server; transmitting, by the proxy server, a request to the resource server for the web content stored on the resource server; receiving, by the proxy server, the web content from the resource server; modifying, by the proxy server, the web content using scripting code stored in a computer memory, wherein the scripting code is injected into the web content to override at least one method in the received web content; transmitting, by the proxy server, the modified web content to the instantiated application in the virtualized environment on the virtualization server for execution by the instantiated application, wherein the instantiated application comprises an operational sandbox within which the application confines execution of the scripting code; in response to the instantiated application on the virtualization server executing any one of the at least one overridden method,
receiving, by the proxy server, from the instantiated application, information associated with the executed one of the at least one overridden method;
receiving, by the media player remotely located from the user computing device, redirected multimedia content and the received information associated with the executed one of the at least one overridden method; and
transmitting, in accordance with a remote presentation protocol, the redirected multimedia content and the received information associated with the executed one of the at least one overridden method for rendering at the user computing device.

18. The one or more non-transitory computer-readable media of claim 17 storing computer-executable instructions that, when executed by one or more processors, cause the computing system, to perform steps comprising:
receiving from the user computing device a request to instantiate the application in the virtualized environment; and
transmitting to the virtualization server the request to instantiate the application in the virtualized environment.

19. The one or more non-transitory computer-readable media of claim 17, wherein the information associated with the executed one of the at least one overridden method comprises an input parameter to a tag in the web content including a uniform resource locator corresponding to multimedia content.

20. The one or more non-transitory computer-readable media of claim 17, wherein the web content is formatted using at least one of: at least one of a video tag, an audio tag, and a canvas tag, and scripting code configured to dynamically create at least one of a video tag, an audio tag, and a canvas tag.

\* \* \* \* \*